United States Patent [19]

Ferriss

[11] 4,329,884
[45] May 18, 1982

[54] SIGNAL PROCESSOR FOR A RESONATOR RESTRAINED GYRO

[75] Inventor: Lincoln S. Ferriss, Lincoln Park, N.J.

[73] Assignee: The Singer Company, Little Falls, N.J.

[21] Appl. No.: 196,495

[22] Filed: Oct. 14, 1980

[51] Int. Cl.³ ............................................ G01C 19/28
[52] U.S. Cl. .................................................. 74/5.6 D
[58] Field of Search ................ 74/5.6 D; 73/504, 505; 331/187

[56] References Cited

U.S. PATENT DOCUMENTS

| | | |
|---|---|---|
| 3,267,746 | 8/1966 | Scotto ................................ 74/5.6 D |
| 3,375,722 | 4/1968 | Riordan et al. .................... 74/5.6 D |
| 3,413,859 | 12/1968 | Riordan ............................. 74/5.6 D |
| 3,802,276 | 4/1974 | Johnston ........................... 74/5.6 D |

FOREIGN PATENT DOCUMENTS 1308205 2/1973 United Kingdom .............. 74/5.6 A

Primary Examiner—Rodney H. Bonck
Attorney, Agent, or Firm—Morris Liss; Thomas W. Kennedy

[57] ABSTRACT

A gyro includes piezoelectric force transducers which are oscillator driven. As the gyro undergoes angular displacement, the oscillators "follow" the instant natural frequency of the transducers and FM signals are generated at the oscillator outputs which are processed by the present invention to produce digital signals proportional to gyro angular inputs and resolved about two axes.

10 Claims, 19 Drawing Figures

FREQUENCY DIFFERENCER

SIGNAL PROCESSOR FOR A RESONATOR RESTRAINED GYRO

BRIEF DESCRIPTION OF THE PRESENT INVENTION

The present invention is directed to a signal processor for a two-axis gyro which utilizes piezoelectric force transducers for generating inherent direct digital output signals.

BACKGROUND OF THE INVENTION

The signal processing system of the present invention is particularly adapted for use with a resonator restrained gyro of the type disclosed in the co-pending U.S. patent application Ser. No. 187010, to William C. Albert and entitled "Resonator Restrained Gyro", assigned to the same assignee as the present application. The resonator restrained gyro disclosed in the mentioned co-pending application is a two-axis gyro which has an inherent direct digital output. This is achieved by utilizing a rotor, connected to a rotatable hub by means of two angularly spaced force transducers, preferably of the piezoelectric resonator variety. An oscillator is connected in circuit with each resonator to form a pair of transducers. The transducers experience a sinusoidally varying axial force due to input angular rates experienced by the gyro case, about X and Y axes. The resonators vary their vibrational frequency in response to axial force, producing output signals which are frequency modulated by the input angular rate. However, the FM signals must be resolved and separated into components which are indicative of input rates about the X and Y axes. Resolution occurs by frequency manipulation of signals derived from the pair of gyro resonators. The frequency-manipulated signals are gated to individual counters which respectively count two values indicative of input rates about the X and Y axes.

The above-mentioned objects and advantages of the present invention will be more clearly understood when considered in conjunction with the accompanying drawings, in which:

DETAILED DESCRIPTION OF THE INVENTION

Figure 1:
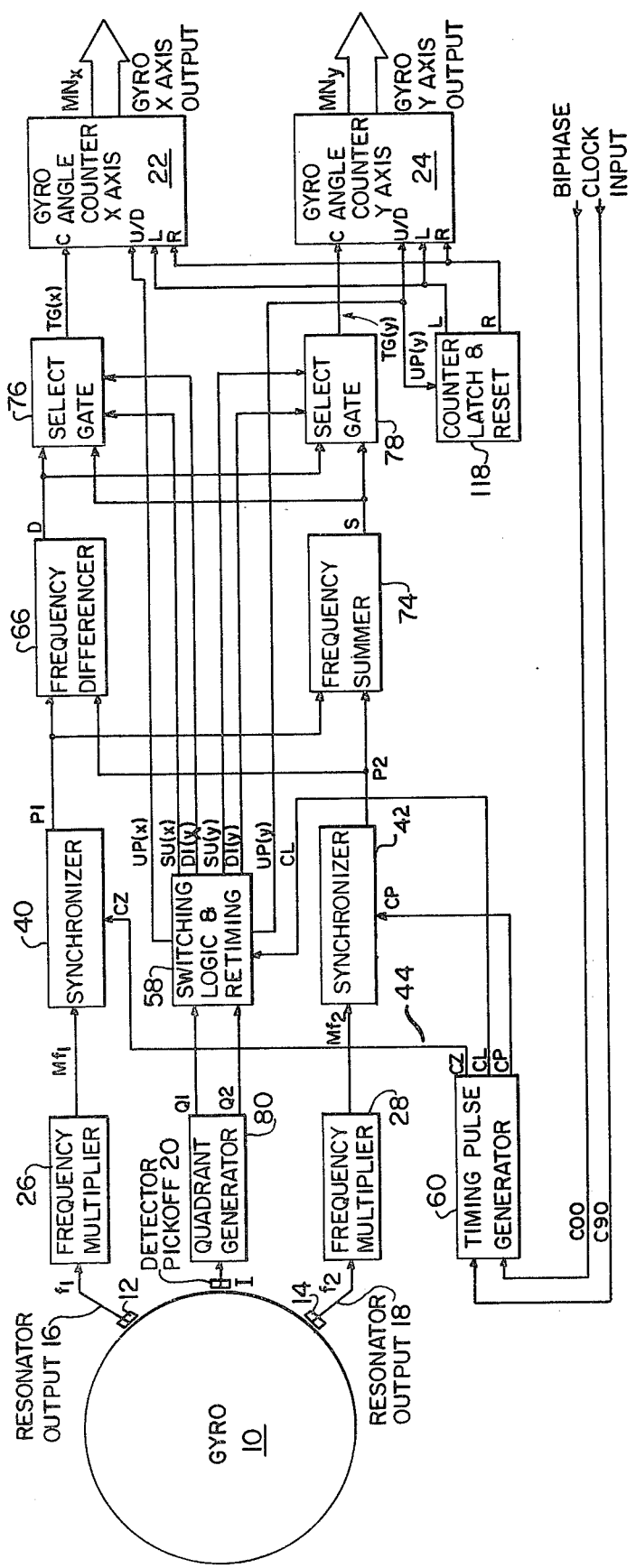
FIG. 1 is a block diagram of the present signal processing system.

Referring to FIG. 1, a gyro 10 of the type described in the previously mentioned co-pending application includes resonators 12 and 14, which include gyro rotor-mounted force transducers physically located 90 degrees apart. The output line 16 of resonator 12 carries a signal of frequency $f_1$ while the output line 18 of resonator 14 carries a signal of frequency $f_2$. A rotor pickoff or reference mark detector (not shown) which may be of the optical, capacitive or magnetic type generates a pulse for each rotation of the rotor symbolically implied by the circle of gyro 10. The outputs of resonators 12 and 14 as well as the output from the detector 20 form the input signals to the processing circuitry shown in FIG. 1. The output counters shown in FIG. 1 develop counts during each cycle of gyro rotor rotation, which are proportional to angular displacement of the gyro case about the X and Y axes. These outputs are indicated in FIG. 1 as $MN_x$ and $MN_y$ where M is a scale factor and N is a respective axis counter count. For each rotation of the rotor of gyro 10, a time period may be divided into four time intervals corresponding with quadrature position of the gyro rotor. These are indicated as $t_0$ through $t_3$. The mathematical expressions for the computation of $N_x$ and $N_y$ are stated in the referenced co-pending application. These expressions may be rewritten as:

$$N_x = \int_{t0}^{t1} fd_{(t)}dt - \int_{t1}^{t2} fs_{(t)}dt - \int_{t2}^{t3} fd_{(t)}dt + \int_{t3}^{t4} fs_{(t)}dt \quad \text{Eq. 1a}$$

$$N_y = \int_{t0}^{t1} fs_{(t)}dt + \int_{t1}^{t2} fd_{(t)}dt - \int_{t2}^{t3} fs_{(t)}dt - \int_{t3}^{t4} fd_{(t)}dt \quad \text{Eq. 1b}$$

Where
$fd_{(t)} = f_1 - f_2$ and
$fs_{(t)} = f_1 + f_2$

It is Equations (1a) and (1b) which are evaluated by the invention, shown in block diagram form in FIG. 1.

The integrations indicated in Equations (1a) and (1b) are accomplished by accumulating the sum and difference frequencies over the appropriate time periods in counters 22 and 24. The sign preceding each integral determines whether the counter is incremented or decremented. At the beginning of each revolution but prior to acquiring count, the counters are latched to the output and zeroed in an "on the fly" manner such that no data is lost. Thus, the counters contain the angular change experienced over the time for the last rotor revolution resolved about the input axes. The output from the counters typically input to a digital computer (not shown) which operates on the data in performing a guidance or navigation function. The computer and its program is not, per se, part of the present invention.

DETAILED DESCRIPTION OF THE INVENTION

Referring to FIG. 1, the outputs 16 and 18 of the resonators 12 and 14 are respectfully connected to frequency multipliers 26 and 28 for the purpose of multiplying the frequencies of the resonators by an integer, commonly an integer power of 2.

Figure 2A:
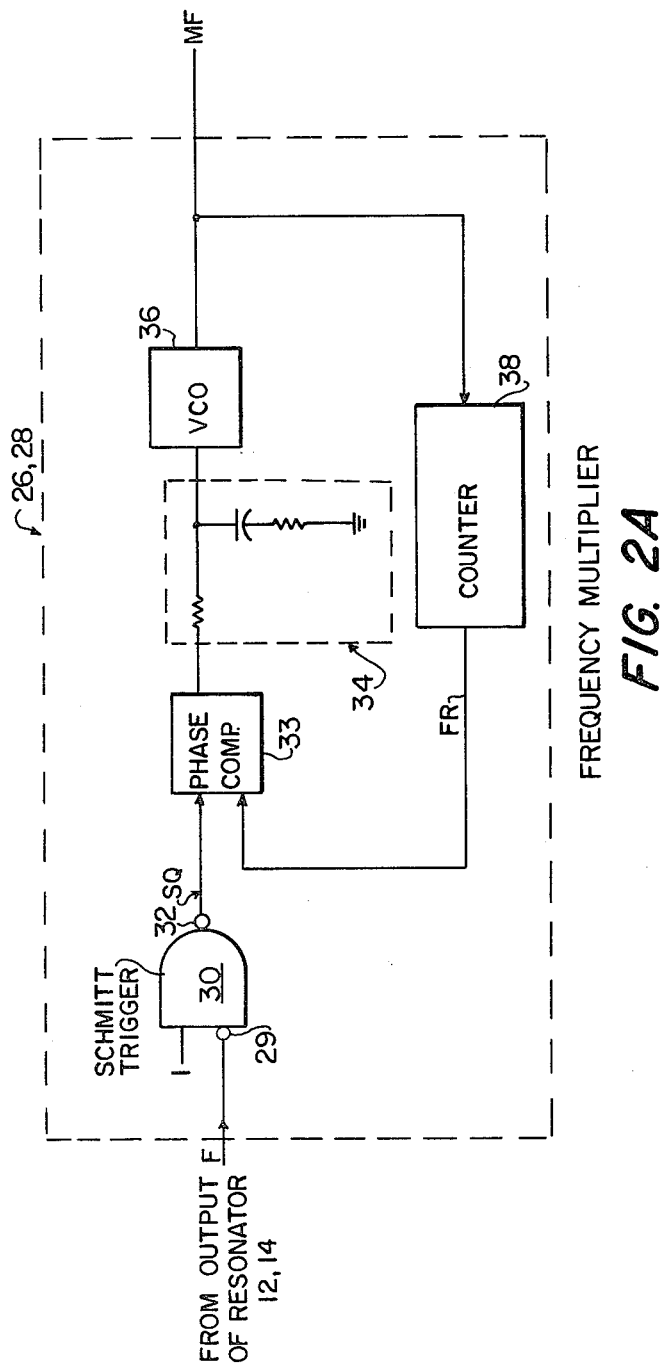
FIG. 2A is a block diagram of the frequency multiplier used in the system.
Figure 2B:
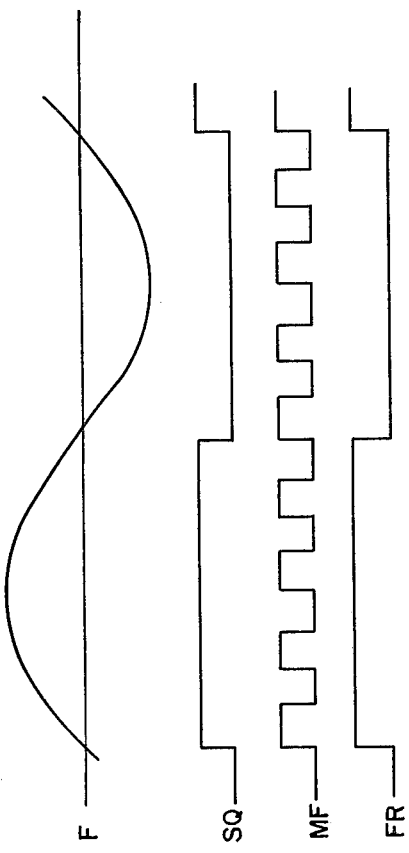
FIG. 2B is a composite timing diagram of various signals occurring in the frequency multiplier.

A suitable phase-locked loop frequency multiplier is shown in FIG. 2A. Referring to that figure, the signal at frequency F shown for illustrative purposes to be a sinusoid (FIG. 2B), is provided at input 29 of a Schmitt Trigger 30. The latter converts, at output 32, the sinuoid to a rectangular wave SQ (FIG. 2B), suitable for inputting to logic circuitry. The phase and/or the rate of change of the phase of SQ is compared at comparator 33 with that of square-wave FR (FIG. 2B). If phase or frequency difference exists, an output from the phase comparator results which, upon filtering by RC filter 34, is applied to the input of a voltage controlled oscillator (VCO) 36. The output frequency from the VCO changes as a result thus causing the frequency and the phase of FR to be the same as those of SQ under which conditions the loop, including a counter 38, is locked. Once locked, the steady state phase error remains zero for input frequency changes and the output frequency is an exact integral multiple M of the input frequency F. The bandwidth of the phase-locked loop should be several times the gyro rotor angular velocity so as to pass the frequency changes of the resonator without distortion.

Frequency multiplied signals $Mf_1$ and $Mf_2$, shown in FIG. 1 are respectively applied to synchronizers 40 and 42 which re-time the inputs to be time coincident with fixed frequency pulse trains CZ along lead 44 while preserving pulse frequency on a one-to-one basis.

Figure 3A:
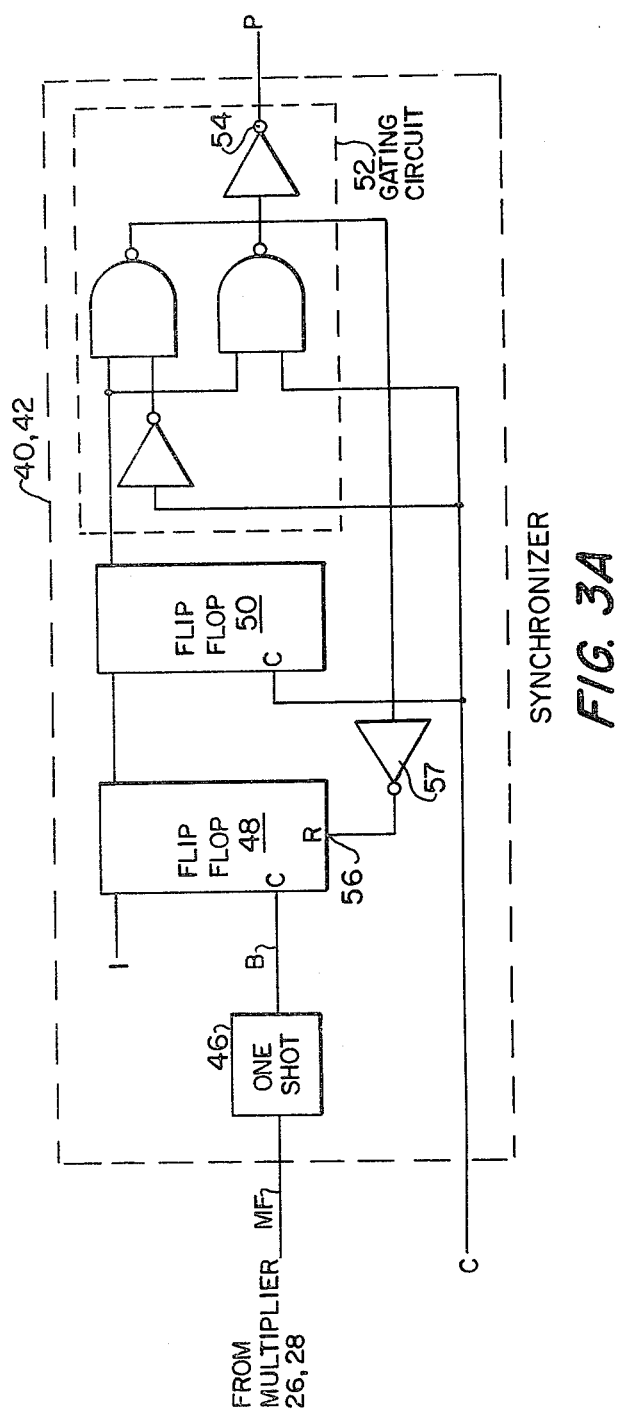
FIG. 3A is a logic diagram of a synchronizer as used in the present system.
Figure 3B:
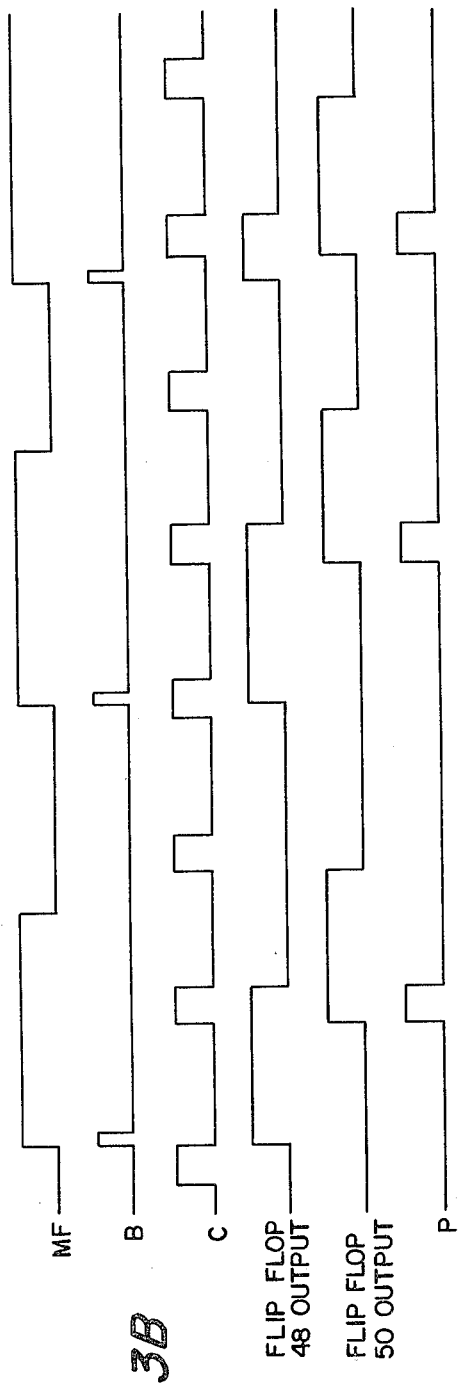
FIG. 3B is a composite timing diagrams of signals appearing at various points in the synchronizer circuitry.

Such a synchronizer is shown in FIG. 3A. Input signal MF, a squarewave from the VCO 36 (FIG. 2A) of the frequency multiplier 26, 28 generates a narrow pulse B (FIG. 3B) by the action of the one shot 46 which sets flip-flop 48 asynchronously with clock signal C (FIG. 3B). The next C pulse clocks flip-flop 48 into flip-flop 50, the output of which is gated by gating circuit 52 to produce signal P (FIG. 3B) at output terminal 54. Flip-flop 48 is reset at the terminal 56 and through inverter 57 with the trailing edge of a clock pulse C, and flip-flop 50 resets with the leading edge of the following clock pulse. By this action, signal P is synchronous with clock pulse C at frequency MF. For this circuit to operate properly, the pulse width of signal B must be less than the pulse repetition period of clock signal C, and the frequency of clock pulse C must be greater than twice that of MF.

Referring once again to FIG. 1, the synchronizers 40, 42 and switching logic and retiming circuits 58 receive clock pulses CZ, CL and CP, respectively, from the timing pulse generator 60. The timing relations among these fixed frequency pulse trains are obtained from a bi-phase clock ordinarily available from a digital computer of the type used in guidance and navigation systems.

Figure 4A:
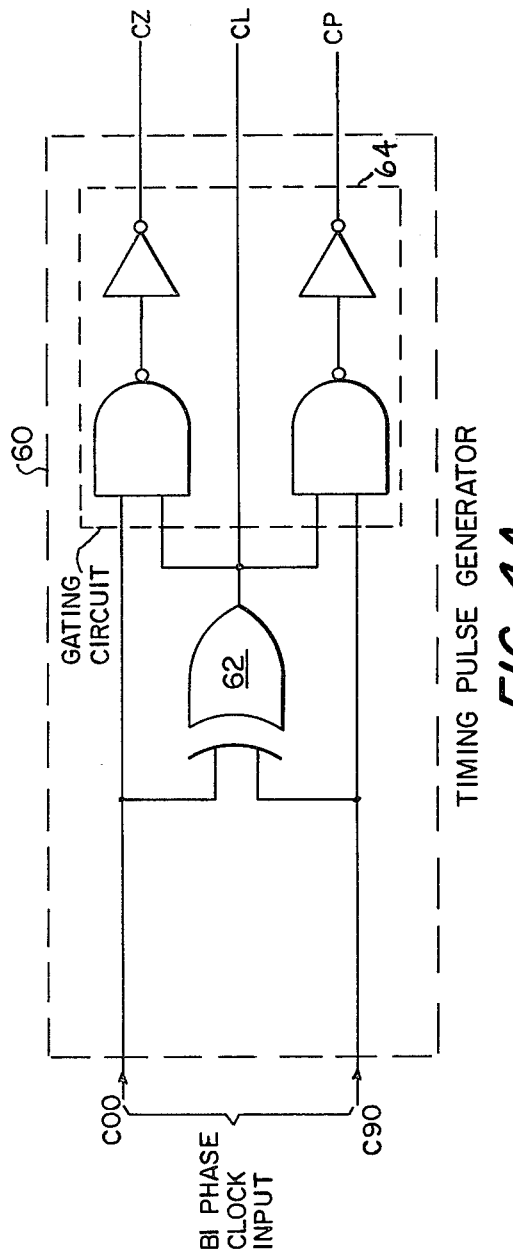
FIG. 4A is a logic diagram of a timing pulse generator as used in the present system.
Figure 4B:
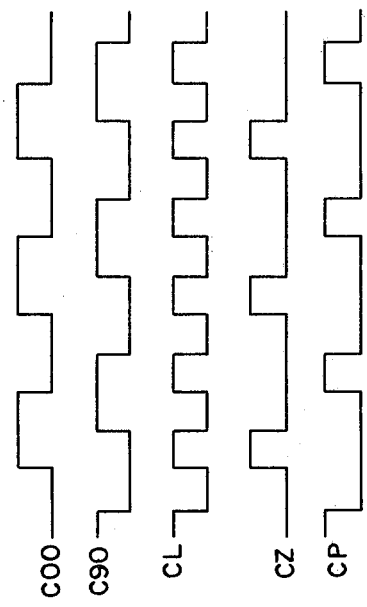
FIG. 4B is a composite timing diagram of signals present at various points in the generator circuit.

The structure of timing pulse generator 60 is shown in detail in FIG. 4A. The bi-phase clock input is a pair of 50 percent duty cycle input signals C00 and C90 displaced 90 electrical degrees from one another and which provide inputs to the exclusive OR gate 62. The output of gate 62 produces signal CL (FIG. 4B) at twice the input frequency. When gated through gating circuit 64 with C00 and C90, 25 percent duty cycle pulse trains CZ and CP (FIG. 4B) are generated at the output of generator 60. These two pulse trains are spaced with no overlap. This characteristic simplifies the logic required to generate difference and sum frequency signals identified at D and S, respectively, in FIG. 1.

Figure 5A:
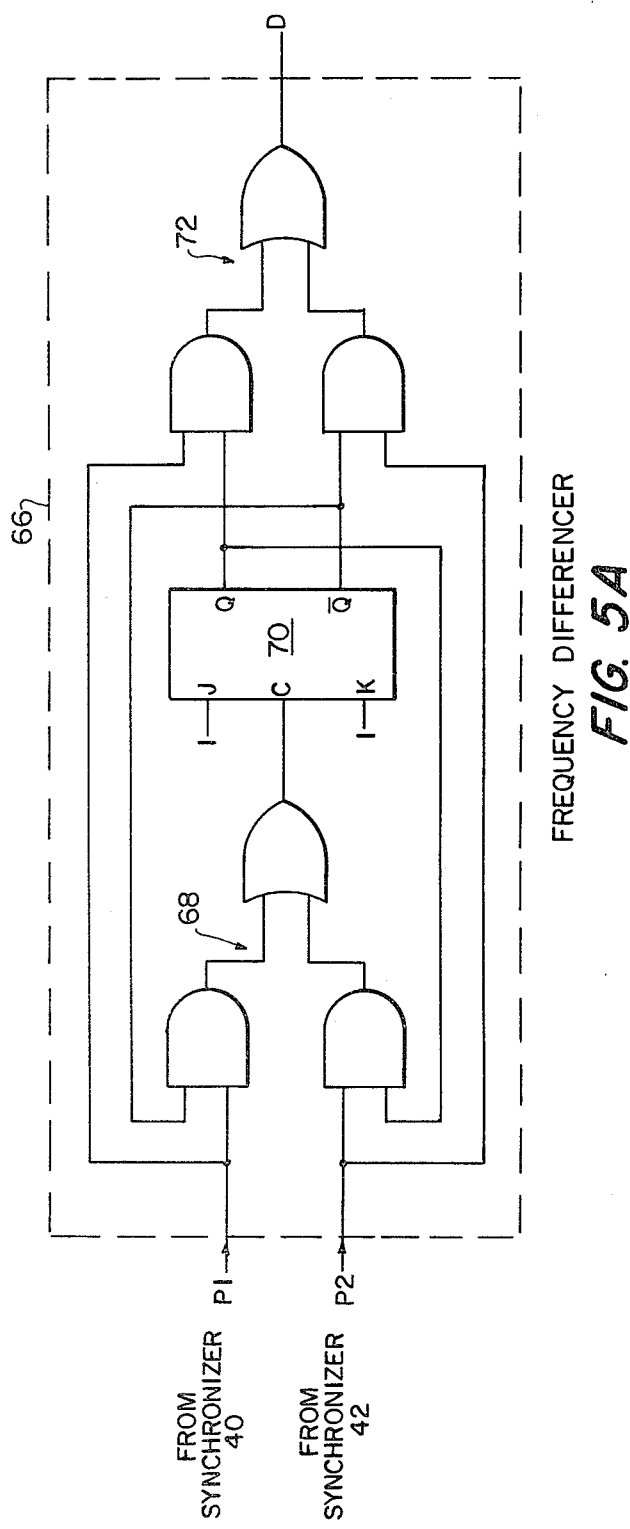
FIG. 5A is a logic diagram of a frequency differencer as utilized in the present system.
Figure 5B:
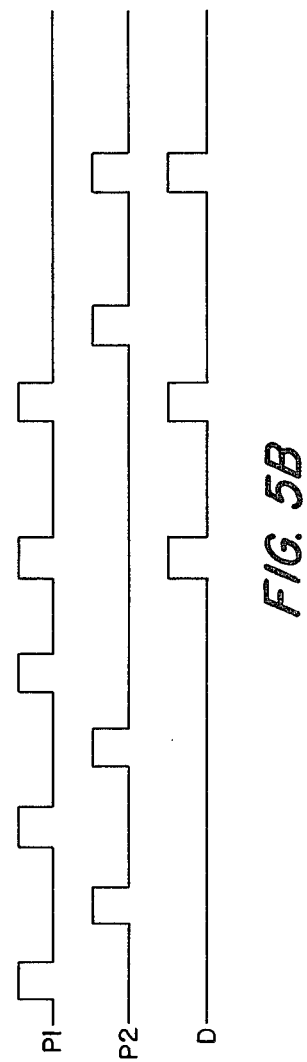
FIG. 5B is a composite timing diagram of signals occurring at various points in the circuitry of the frequency differencer.

Inasmuch as synchronizer 40, operating on $Mf_1$ is supplied with clock pulse signal CZ and the synchronizer 42, operating on $Mf_2$ is clocked with signal CP, synchronizer output signal pulses P1 and P2 indicated in FIG. 1 and plotted in FIG. 5B are spaced with no overlap and are never time coincident. Thus, the frequency differencer 66 need not have coincidence detection circuitry.

Figure 6A:
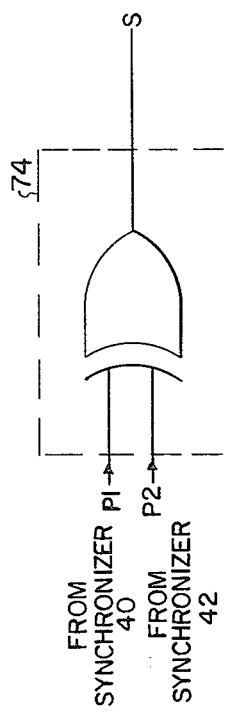
FIG. 6A is a logic gate serving as a frequency summer for the present system.
Figure 6B:
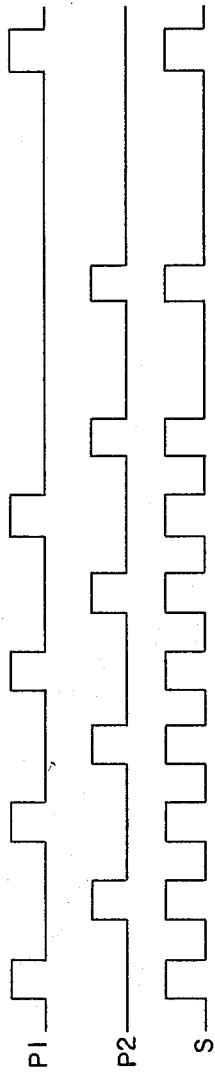
FIG. 6B is a composite timing diagram showing the inputs and output of the frequency summer.
Figure 7:
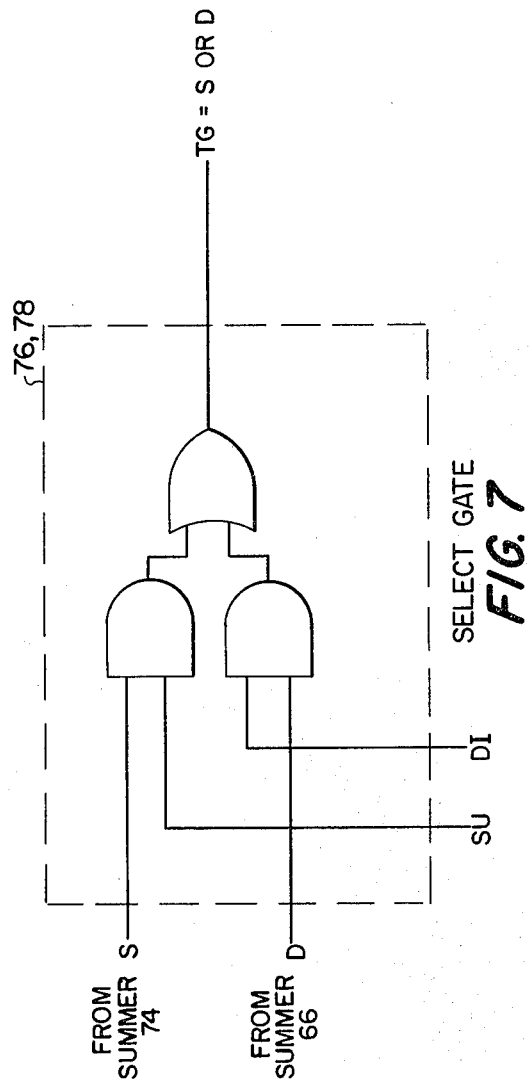
FIG. 7 is a logic diagram of a select gate as utilized in the present system.

FIG. 5A shows the configuration for an appropriate frequency differencer 66. Alternate input signals P1 and P2 (FIG. 5B) are gated by the AND-OR select gate 68 to cause toggling of the flip-flop 70. The enabling sequence of the AND-OR select gate 72 prevents an output from differencer 66. Only with two or more successive input pulses P1 and P2 will output pulses D (FIG. 5B) appear. The frequency sum generation is similarly simplified by the elimination of coincidence detection. The summer 74 is a single two-input EXCLUSIVE-OR gate, shown in FIG. 6A. FIG. 6B illustrates the resultant output signal S for the input signals P1 and P2. Having both difference (D) and sum (S) frequencies generated, the logic hardware shown in FIG. 1 to effect sum or difference frequency selection for each counter 22, 24 is implemented by AND-OR select gates 76, 78. A typical gate is shown in FIG. 7. The sum and difference frequencies are at the S and D signal inputs, respectively. Complementary logic level input signals SU and DI determine whether the toggle output signal (TG) is S (SU=1) or D (DI=1).

Figure 8:
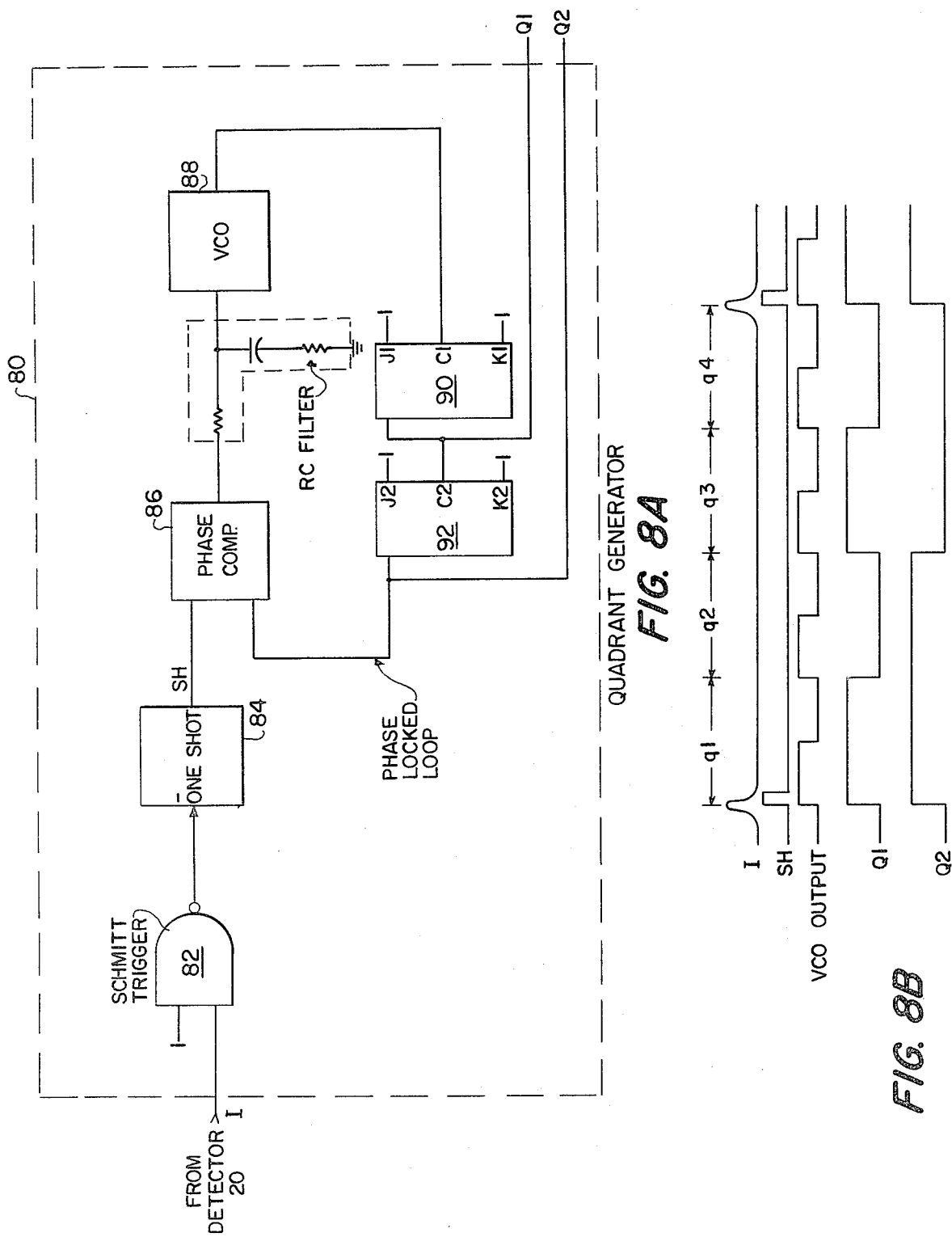
FIG. 8A is a logic diagram of a quadrant generator as utilized in the present system.
FIG. 8B is a composite timing diagram of signals occurring at various points in the generator.

The generation of the SU and DI signals depends upon quadrant generator 80 shown in FIG. 1. A single reference point or mark on a rotating member (not shown) of gyro 10 is sufficient to generate signals indicative of quadrant succession of the member and thence integration intervals and polarities associated with the accumulation of sum and difference pulse trains in the gyro angle counters 22 and 24. The generator 80 is shown in FIG. 8A. An electro-optical, capacitive or other type of detector 20 generates a pulse signal I as the gyro rotating member with the reference mark, passes adjacent to the detector. As shown in FIG. 8B, the pulse signal I is shaped to a logic-level pulse by the Schmitt Trigger 82 and shaped to a moderately narrow pulse signal SH by a one shot multivibrator 84. In FIG. 8A, the phase comparator 86, VCO 88 and flip-flops 90 and 92 comprise a phase-locked loop with a frequency multiplication factor of 4. The leading edges of signals SH and Q2 (FIG. 8B) are maintained in coincidence. Quadrants are defined by consideration of the states of Q1 and Q2 which are input signals to the switching logic and retiming circuits 58 which in turn is intended to generate control signals for the X and Y axis select gates 77, 78 and counters 22, 24.

Figure 9:
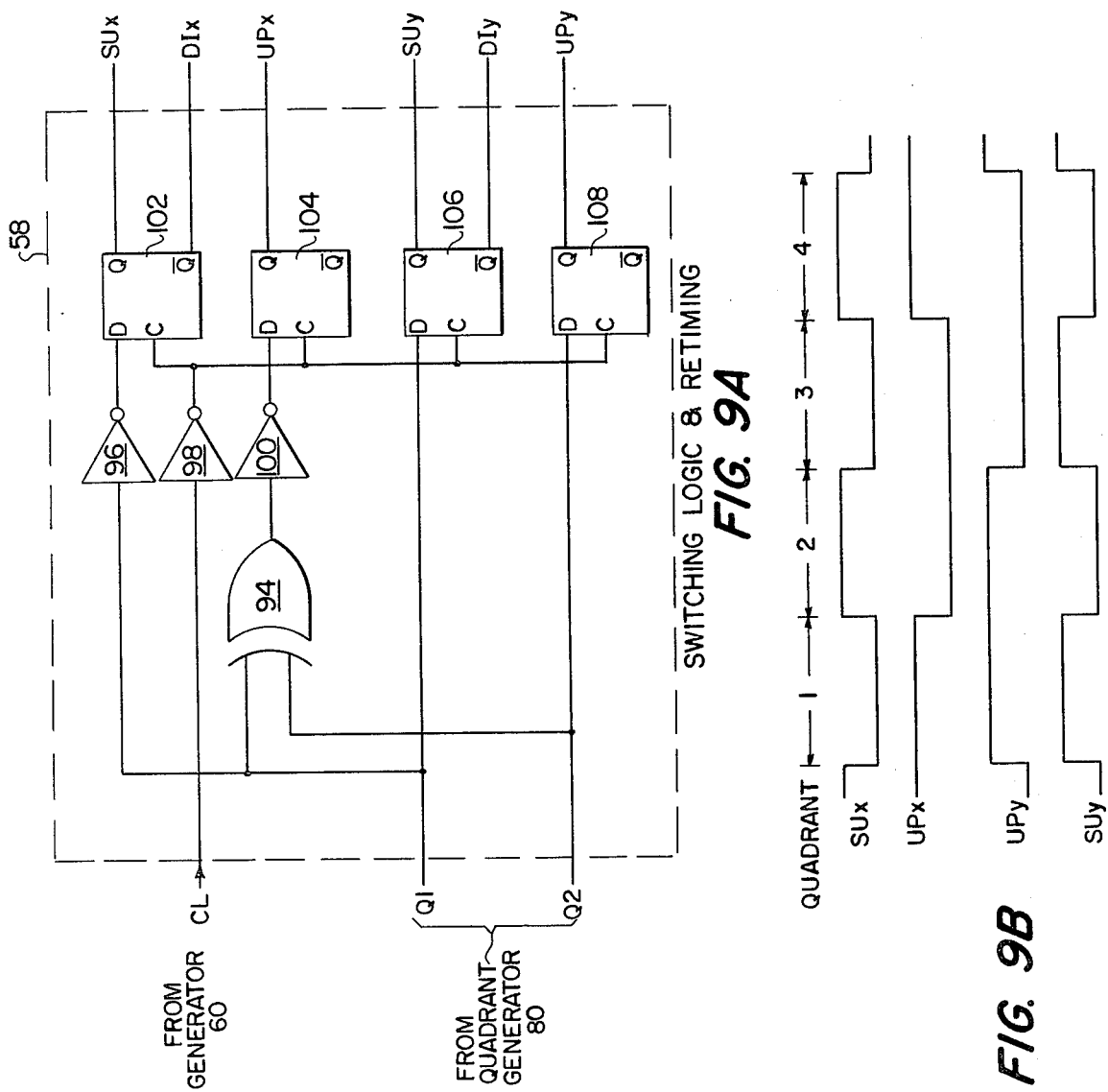
FIG. 9A is a logic diagram of a switching logic and retiming circuit as utilized in the present system.
FIG. 9B is a composite timing diagram of various outputs of the switching logic and retiming circuitry.

The structure of the switching logic and retiming circuit 58 is shown in detail in FIG. 9A. All flip-flops, 102, 104, 106 and 108, are clocked simultaneously with the output of inverter 98 which receives its input CL from generator 60. Flip-flop 104 generates control signal $UP_x$ at the Q output based on the EXCLUSIVE NOR function of Q1 and Q2 provided by EXCLUSIVE OR gate 94 followed by inverter gate 100. Flip-flop 102 generates control signal $SU_x$ and the complement $DI_x$ from Q1's complement, provided by inverter 96. $SU_y$ and complement $DI_y$ is provided by flip-flop 106 from Q1. $UP_y$ is similarly provided by flip-flop 108 from Q2.

In order to appreciate how signal Q1 affects counters 22, 24, consider control signal $SU_x$ which causes the sum frequency to be inputted to the X axis counter 22 during the second and fourth quadrants, during which time the Q1 signal has the same logic level. In a similar manner the Q1 signal is used to determine signal $SU_y$ where the sum frequency is inputted to the Y axis couner for the first and third quadrants.

The up-down lines (U/D) of the counters are handled in a similar manner. The Y counter 24 is to be incremented during quadrants 1 and 2, and Q2 is used to generate $UP_y$. For the X counter 22, where the up line must be high during the first and fourth quadrants, the EXCLUSIVE NOR function of Q1 and Q2 follows that sequence and is used to generate $UP_x$. As previously mentioned in connection with FIG. 9A, each of the control signals $SU_x$, $SU_y$, $UP_x$ and $UP_y$ are retimed using flip-flops 102–108 in synchronism with the clock signal CL. This causes the control levels to the select gates 76, 78 and counters 22, 24 to change during a time when input pulses are not present thereby preventing ambiguous counts.

Figure 10:
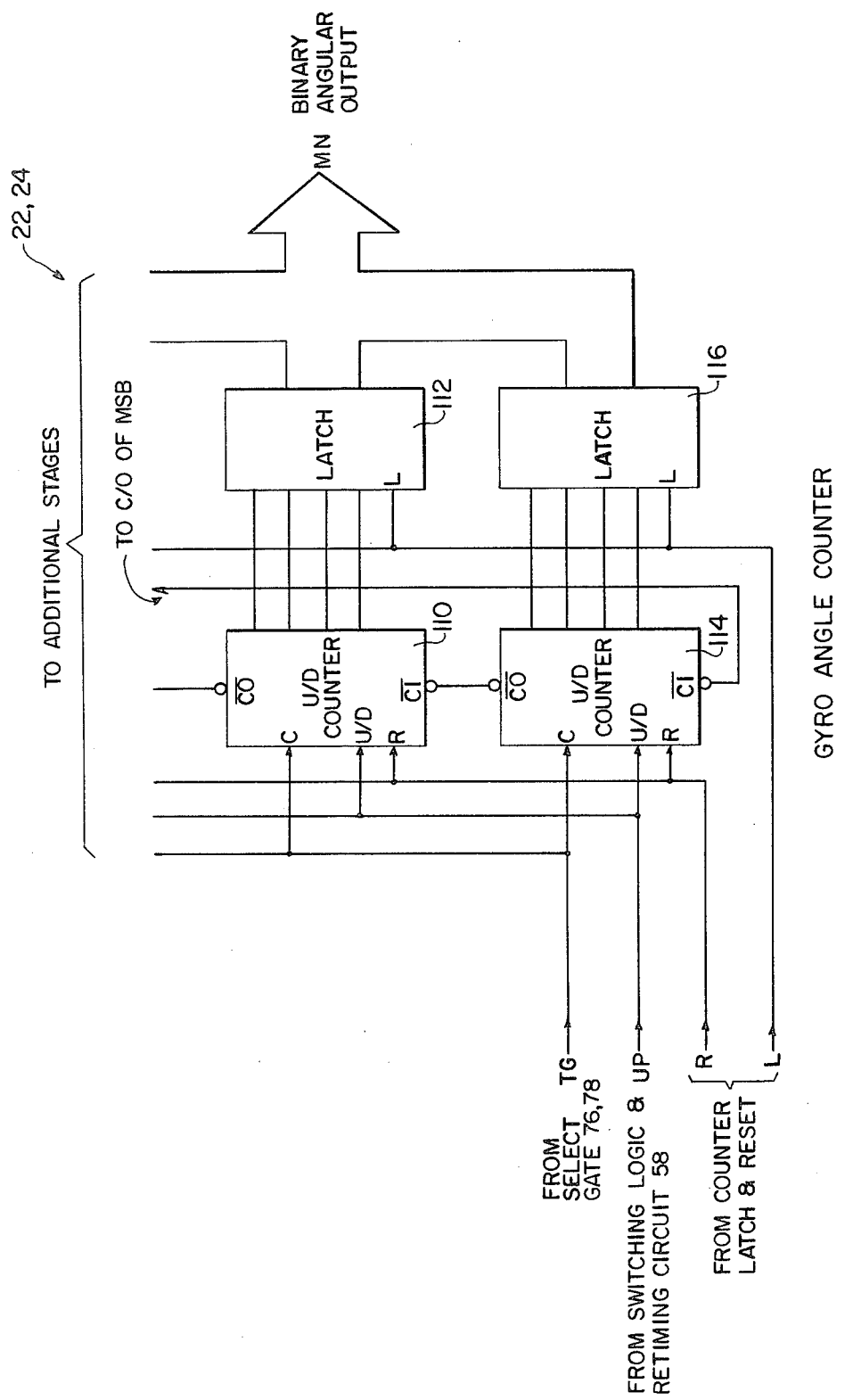
FIG. 10 is a logic diagram of a gyro angle counter as utilized in the present system.

As shown in FIG. 10, the gyro angle counters 22, 24 are assembled from pairs of up-down counters 110, 114 and respectively connected latches 112, 116 expandable to meet maximum gyro input rates. Counters are cascaded with the carry-out of the most significant bit connected to the carry-in of the next higher order bit. The counter sequence ends with a latch pulse signal L delivered to the latches which transfers the counter contents to the latches. When the latch pulse signal L goes to a logic 0, the latches hold their contents until the next update, one revolution later. Immediately following a latch pulse signal is a reset pulse R which sets the up-down counters to zero. Alternatively, the counters could be preset to a number representing the negative of the gyro bias for that axis by activating preset enable inputs (not shown) rather than the reset input. Latching, resetting and changes in the state of the up-down (UP) signal happen before the occurrence of the first toggle pulse (TG) from the select gates 76, 78 associated with the gyro angle counters 22, 24 for the axis under consideration. As previously explained, a logic 1 in the up-down (UP) signal causes toggle pulses (TG) to increment the counters 22, 24. After one gyro rotor revolution, the counters 22, 24 contain the change in angle experienced by the gyro during that time, resolved along a corresponding input axis.

Figure 11A:
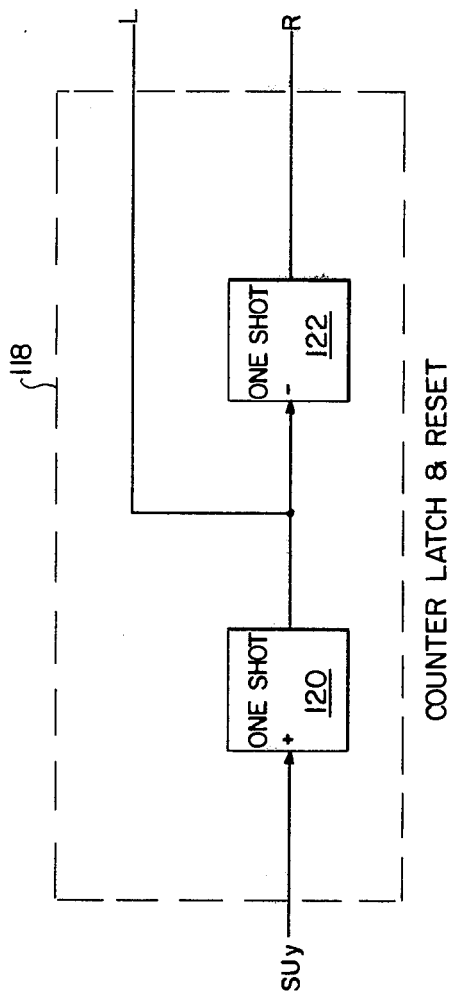
FIG. 11A is a block diagram of a counter latch and reset circuit as utilized in the circuitry of the present system.
Figure 11B:
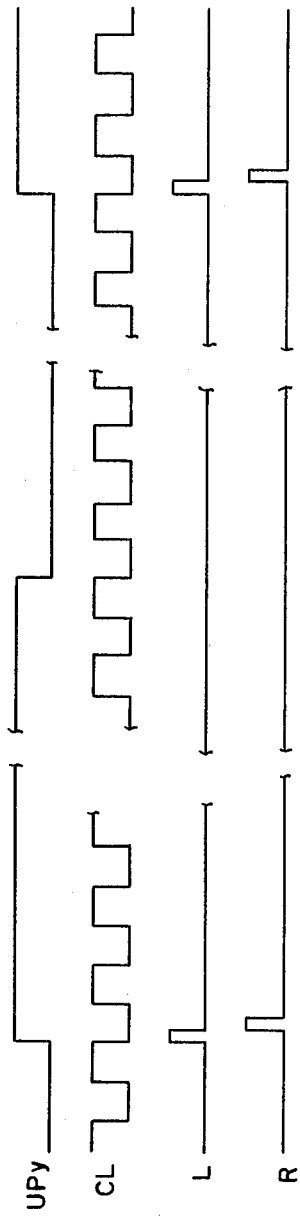
FIG. 11B is a composite diagram showing the outputs from the counter latch and reset circuit.

The counter latch and reset pulse generator 118 of FIG. 1 is shown in detail in FIG. 11A. Control signal $SU_y$ (FIG. 11B) from switching logic and retiming circuit 58 goes to a logic 1 at the beginning of a first integration interval, synchronously with the clock signal. Using a pair of cascaded one shots 120, 122, a pair of narrow pulses, L and R (FIG. 11B) are produced in succession, all before the signal CL goes to a logic 1, thereby effecting latching and resetting of the counter.

For each cycle of rotor rotation, the counters 22, 24 will include counts $MN_x$ and $MN_y$ which respectively resolve gyro angular input about the X and Y axes.

It should be understood that the invention is not limited to the exact details of construction shown and described herein for obvious modifications will occur to persons skilled in the art.

I claim:

1. A signal processor for a gyro equipped with at least two force responsive resonators, respectively generating signals of first and second frequencies during gyro operation, and wherein the gyro further includes means for detecting rotation of a gyro rotor through four quadrants, the processor comprising:
   means for generating signals indicative of rotation through each respective quadrant;
   means for adding the frequencies of the first and second frequency signals;
   means for subtracting the frequencies of the first and second frequency signals;
   switching means connecting at the input thereof to the output of the signal generating means for producing control signals corresponding to gyro rotor rotation through the four quadrants;
   gating means controlled by the control signals and having the added frequency signals and the subtracted frequency signals present at inputs thereof;
   a first counter controlled by the control signals and having an input connected to an output of the gating means for counting to a value proportional to gyro angular input about a first axis; and
   a second counter controlled by the control signals and having an input connected to an output of the gating means for counting to a value proportional to gyro angular input about a second axis.

2. The subject matter set forth in claim 1 wherein the gating means comprises:
   first and second gates for respectively selecting added or subtracted signals at particular instants of time depending upon the quadrature state through which a gyro rotor is passing.

3. The subject matter set forth in claim 1 wherein the first counter counts to a value proportional to the quantity expressed by the equation $$N_x = \int_{t0}^{t1} fd_{(t)}dt - \int_{t1}^{t2} fs_{(t)}dt - \int_{t2}^{t3} fd_{(t)}dt + \int_{t3}^{t4} fs_{(t)}dt$$

where $t_0$ through to $t_4$ are corresponding quadrature intervals and where $f_d$ equals the subtracted frequency signals and $f_s$ equals the added frequency signals.

4. The subject matter set forth in claim 3 wherein the second counter counts to a value proportional to the quantity expressed by the equation $$N_y = \int_{t0}^{t1} fs_{(t)}dt + \int_{t1}^{t2} fd_{(t)}dt - \int_{t2}^{t3} fs_{(t)}dt - \int_{t3}^{t4} fd_{(t)}dt$$

where $t_0$ through $t_4$ are corresponding quadrature intervals and where $f_d$ equals the subtracted frequency signals and $f_s$ equals the added frequency signals.

5. A signal processor for a gyro equipped with at least two force responsive resonators respectively generating signals of first and second frequencies during gyro operation and wherein the gyro further includes means for detecting rotation of a gyro rotor, the processor comprising:

- means for individually multiplying the frequencies of the first and second signals;
- means for synchronizing the individual signals of the multiplied frequencies with a fixed frequency signal;
- means connected to the output of the synchronizing means for adding frequencies of the first and second signals;
- means connected to the output of the synchronizing means for subtracting frequencies of the first and second signals;
- means responsive to the detecting means for generating signals indicative of rotation through each respective quadrant;
- switching means connected at its input to the output of the signal generating means for producing control signals corresponding to rotor rotation through the four quadrants;
- first gating means having respective inputs connected to the adding means, the subtracting means and the switching means for selecting the adding or subtracting means input, in accordance with the state of the switching means;
- second gating means having respective inputs connected to the adding means, the subtracting means and the switching means for selecting the adding or subtracting means input, in accordance with the state of the switching means;
- a first counter connected at an input thereof to the output of the first gating means for counting pulses enabled by the gating means in accordance with the control signals, the counter pulses, during a revolution of the rotor, being proportional to gyro angular input about a first axis; and
- a second counter connected at an input thereof to the output of the second gating means for counting pulses enabled by the gating means in accordance with the control signals, the counter pulses, during a revolution of the rotor, being proportional to gyro angular input about a second axis.

6. The subject matter set forth in claim 5 wherein the counted pulses of the first counter ($N_x$) is expressed by the equation:

$$N_x = \int_{t0}^{t1} f_{d(t)}dt - \int_{t1}^{t2} f_{s(t)}dt - \int_{t2}^{t3} f_{d(t)}dt + \int_{t3}^{t4} f_{s(t)}dt$$

where $t_0$ through $t_4$ are corresponding quadrature intervals and where $f_d$ equals the subtracted frequency signals and $f_s$ equals the added frequency signals.

7. The subject matter set forth in claim 6 wherein the counted pulses of the second counter ($N_y$) is expressed by the equation:

$$N_y = \int_{t0}^{t1} f_{s(t)}dt + \int_{t1}^{t2} f_{d(t)}dt - \int_{t2}^{t3} f_{s(t)}dt - \int_{t3}^{t4} f_{d(t)}dt$$

where $t_0$ through $t_4$ are corresponding quadrature intervals and where $f_d$ equals the subtracted frequency signals and $f_s$ equals the added frequency signals.

8. The subject matter set forth in claim 7 wherein the force responsive resonators include crystal transducers mounted to a gyro rotor.

9. The subject matter of claim 8 wherein the transducers are angularly mounted to the rotor at 90 degree displacement from one another.

10. The subject matter of claim 9 wherein the rotation detector comprises means for detecting periodic rotation of a single reference point located on a rotor of the gyro.

* * * * *